United States Patent
Budmiger

(10) Patent No.: US 6,708,569 B2
(45) Date of Patent: Mar. 23, 2004

(54) METHOD OF OPERATING AN ELECTROMAGNETIC FLOWMETER

(75) Inventor: Thomas Budmiger, Ettingen (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 10/157,930

(22) Filed: May 31, 2002

(65) Prior Publication Data

US 2003/0005777 A1 Jan. 9, 2003

Related U.S. Application Data

(60) Provisional application No. 60/310,254, filed on Aug. 7, 2001.

(30) Foreign Application Priority Data

Jul. 6, 2001 (EP) .............................. 01116432

(51) Int. Cl.[7] ................................. G01F 1/58
(52) U.S. Cl. ................................... 73/861.12
(58) Field of Search ....................... 703/861.12, 861.17, 703/861.16; 324/309, 306

(56) References Cited

U.S. PATENT DOCUMENTS

| 3,783,687 | A | * | 1/1974 | Mannherz et al. | ....... 73/861.17 |
| 4,206,641 | A | * | 6/1980 | Takada | ................ 73/861.17 |
| 4,210,022 | A | * | 7/1980 | Boss | .................... 73/861.17 |
| 4,545,257 | A | * | 10/1985 | Tomita | .................... 73/861.17 |
| 4,651,286 | A | * | 3/1987 | Fukai et al. | ................. 702/45 |
| 4,704,908 | A | | 11/1987 | Blatter | |
| 4,723,449 | A | * | 2/1988 | Tiley | ....................... 73/861.17 |
| 4,969,363 | A | | 3/1989 | Mochizuki | ............... 73/861.17 |

FOREIGN PATENT DOCUMENTS

EP  0 336 615  10/1989

OTHER PUBLICATIONS

Patent Abstract of Japan. vol. 1998, No. 11, Sep. 30, 1998, JP 10 170317, Yokogawa Electric Corp.
Patent Abstract of Japan, vol. 1998, No. 13, Nov. 30, 1998, JP 10 213466, Yokogawa Electric Corp.

* cited by examiner

*Primary Examiner*—Edward Lefkowitz
*Assistant Examiner*—Jewel V. Thompson
(74) *Attorney, Agent, or Firm*—Jones, Tullar & Cooper, P.C.

(57) ABSTRACT

The flowmeter comprises a flow sensor with a flow tube, two coils, and two measuring electrodes as well as measuring and control electronics. The method serves to compensate interfering potentials that are caused by inductive and/or capacitive interference arising from the coil leads and/or by particles of foreign matter or air bubbles in the liquid to be measured and/or by coatings on the measuring electrodes. During first subcycles of the excitation current, a measurement signal proportional to volumetric flow rate is computed as usual. During second subcycles of the excitation current, at least one voltage pulse is applied to at least one of the measuring electrodes.

26 Claims, 2 Drawing Sheets

METHOD OF OPERATING AN ELECTROMAGNETIC FLOWMETER

This application claims the benefit of provisional No. 60/310,254 filed on Aug. 7, 2001.

FIELD OF THE INVENTION

This invention relates to a method of operating an electromagnetic flowmeter for measuring the volumetric flow rate of an electrically conductive and flowing liquid.

BACKGROUND OF THE INVENTION

Electromagnetic flowmeters commonly comprise a flow sensor and measuring and control electronics coupled thereto. In the following, only flowmeters or flow sensors will be spoken of if necessary for simplicity.

As is well known, electromagnetic flowmeters measure the volumetric flow rate of an electrically conductive liquid flowing in a pipe; thus, per definitionem, the liquid volume flowing through a pipe cross section per unit time is measured.

The flow sensor has a, usually nonferromagnetic, flow tube which is connected into the pipe in a liquid-tight manner, e.g., by means of flanges or threaded joints. The portion of the flow tube which contacts the liquid is generally electrically nonconductive, so that a voltage induced in the liquid according to Faraday's law of electromagnetic induction by a magnetic field cutting across the flow tube will not be short-circuited.

Therefore, metal flow tubes are commonly provided with a nonconductive lining, e.g., a lining of hard rubber, polyfluoroethylene, etc., and are generally nonferromagnetic; in the case of flow tubes made completely of plastic or ceramic, particularly of alumina ceramic, the nonconductive lining is not necessary.

The magnetic field is produced by means of two coil assemblies, each of which is, in the most frequent case, positioned on the outside of the flow tube along a diameter of the latter. Each coil assembly commonly consists of an air-core coil or of a coil with a soft magnetic core.

To ensure that the magnetic field produced by the coils is as homogeneous as possible, the coils are, in the most frequent and simplest case, identical and electrically connected in series, so that in operation they can be traversed by the same excitation current. It is also known to cause the same excitation current to flow through the coils alternately in the same and the opposite direction, see U.S. Pat. No. 5,646,353, in order to be able to measure the viscosity of non-Newtonian fluids, i.e., of fluids of high viscosity.

The excitation current just mentioned is produced by control electronics; it is regulated at a constant value of, e.g., 85 mA, and its direction is periodically reversed; this prevents the development of electrochemical interference voltages at the measuring electrodes. The current reversal is achieved by incorporating the coils in a so-called T network or a so-called H network; for the current regulation and current reversal, see U.S. Pat. No. 4,410,926 or U.S. Pat. No. 6,031,740.

The aforementioned induced voltage is developed between at least two galvanic, i.e., liquid-wetted, measuring electrodes, or between at least two capacitive measuring electrodes, i.e., two electrodes disposed in the wall of the flow tube, for example, with each of the electrodes picking off a separate potential.

In the most frequent case, the measuring electrodes are arranged at diametrically opposed positions such that their common diameter is perpendicular to the direction of the magnetic field and, thus, perpendicular to the diameter on which the coil assemblies are located. The induced voltage is amplified, and the amplified voltage is conditioned by means of evaluation electronics to form a measurement signal which is recorded, displayed, or further processed.

The potential at each electrode is not only dependent on the magnetic field according to Faraday's law—the geometrical/spatial dimensions of the flow tube and the properties of the liquid enter into this dependence—, but interfering potentials of different geneses are superimposed on this measurement signal, which is based on Faraday's law and should be as pure as possible.

In principle, the absolute value of the potential at the respective electrode is immaterial for the measurement of volumetric flow rate, but only on condition that, on the one hand, the potentials lie in the dynamic range of a differential amplifier following the measuring electrodes, i.e., that this amplifier must not be overdriven by the potentials, and that, on the other hand, the frequency of potential changes differs appreciably from the frequency of the above-mentioned current reversal.

A first kind of interfering potential results from inductive and/or capacitive interference which arises from coil assemblies and their leads and changes the electric charge on the capacitor that exists at the interface between electrode and liquid. As a result of asymmetries in the concrete structure of the flow sensor, particularly as far as the conductor routing to the coil assemblies and the measuring electrodes is concerned, the interfering potential of one electrode generally differs from the interfering potential of the other electrode.

This—first—effect may, on the one hand, restrict the dynamic range of the differential amplifier. On the other hand, the value of the difference between the interfering potentials of the electrodes is subject to variances in flow-sensor parameters due to manufacturing tolerances. Also, the determinable dependence of the potentials of the measuring electrodes on the velocity of the liquid is partly due to this effect, because at low velocities, the above-mentioned charges at the interface between electrode and liquid are not removed by the latter.

A second kind of interfering potential is caused by particles of foreign matter or by air bubbles which are entrained by the liquid and which, when hitting an electrode, cause sudden changes in the potential of the latter. The decay time of these changes is dependent on the type of liquid and is in any case greater than the transient time of the changes.

This—second—effect, too, results in an erroneous measurement signal. The resulting error is also dependent on the potential of the electrode. Since this potential varies from flow sensor to flow sensor due to manufacturing tolerances as was explained above, the second effect adds to the first effect, so that the individual flow sensor units differ widely in their behaviors, which, of course, is highly undesirable.

A third kind of interfering potential is caused by coatings deposited by the liquid on the measuring electrodes, as is also described in U.S. Pat. No. 5,210,496, for example. The formation of the coatings is very strongly dependent on the velocity of the liquid. The differences in the behavior of the individual flow sensor units are even further increased by the formation of the coatings.

JP-A 10213466 proposes to apply voltages generated by means of the measuring and control circuit to at least one of the two measuring electrodes at least temporarily within a period in which the excitation current does not flow and in which consequently no voltage is induced in the fluid. In the flowmeter disclosed in JP-A 10213466, the temporarily applied voltage serves to measure and evaluate the interface capacitances built up at the measuring electrodes, i.e., in effect to compensate interfering potentials of the first and/or third kinds.

A disadvantage of the prior-art flow sensors is that because of the intermediate turning off of the excitation current, the flow rate can only be sampled very coarsely.

SUMMARY OF THE INVENTION

It is an object of the invention to provide a method whereby the aforementioned interfering potentials can be prevented as effectively as possible or at least be largely compensated, and which simultaneously permits high-resolution sampling of the flow rate.

To attain this object, the invention provides a method of operating an electromagnetic flowmeter having a flow tube connected into a fluid-conveying line, said method comprising the steps of:

causing the fluid to flow through the flow tube;

causing a, particularly bipolar, excitation current generated by means of a measuring and control circuit of the flowmeter to flow through a coil assembly mounted on the flow tube for producing a magnetic field cutting across the fluid;

inducing a voltage in the moving fluid for changing potentials applied at measuring electrodes positioned at the flow tube;

removing potentials applied to the measuring electrodes for producing a measurement signal derived from the voltage induced in the moving fluid; and applying at least intermittently a discharge voltage generated by a measuring and control circuit to at least one of the measuring electrodes during the flow of the excitation current through the coil assembly.

Furthermore, the invention provides an electromagnetic flowmeter for a fluid flowing in a line, comprising:

a flow tube connectable into the line for conducting the fluid;

a measuring and control circuit;

means fed by the measuring and control circuit for producing a magnetic field cutting across the flow tube with a coil assembly mounted on the flow tube and traversed by an excitation current;

at least two measuring electrodes for picking off potentials which are induced in the fluid flowing through the flow tube, which fluid is penetrated by the magnetic field;

means connected at least intermittently to the measuring electrodes for generating at least one measurement signal derived from the potentials induced in the fluid; and means controlled by the measuring and control circuit for generating voltage pulses at the measuring electrodes, said means for generating voltage pulses being controlled such that the voltage pulses are applied to the measuring electrodes when the excitation current is different from zero.

In a first preferred embodiment of the method of the invention, the discharge voltage is an at least intermittently periodic sequence of voltage pulses.

In a second preferred embodiment of the method of the invention, the excitation current is at least intermittently clocked periodically with a predeterminable period, with the period of the clocked excitation current being different from a period of the sequence of voltage pulses.

In a third preferred embodiment of the method of the invention, the period of the clocked excitation current is greater than the period of the sequence of voltage pulses.

In a fourth preferred embodiment of the method of the invention, two successive voltage pulses are of like polarity.

In a fifth preferred embodiment of the method of the invention, two successive voltage pulses are of different polarity.

In a sixth preferred embodiment of the method of the invention, the voltage pulses have a width substantially smaller than a pulse width of the excitation current.

In a seventh preferred embodiment of the method of the invention, voltage pulses are applied intermittently to both measuring electrodes.

One fundamental idea of the invention is to largely prevent or compensate interfering potentials of the kinds described, on the one hand, by repeated application of the discharge voltage, particularly at as high a clock rate as possible, and, on the other hand, by constant reversal of the polarity of the discharge voltage, and, despite this discharge process, except for the usual reduction in dynamic range due to the polarity reversal of the magnetic field, to have to trade off no or only a minimum reduction in the sampling frequency of the measurement voltage induced in the fluid. Another fundamental idea of the invention is to apply the discharge voltage to the measuring electrodes at a rate of change, i.e., a repetition rate, higher than the rate of change of the interfering potentials, thus causing charges on the interface and/or stray capacitances which on a time average are substantially uniform.

One advantage of the invention is that the interfering potentials resulting from inductive/capacitive interference, the interfering potentials resulting from particles of foreign matter and/or air bubbles entrained by the liquid, and the interfering potentials resulting from the formation of measuring-electrode coatings can be selectively reduced or even eliminated, so that the wide manufacturing spread can be minimized and flow sensor units of uniform behavior can be manufactured. Another advantage of the invention is that despite the discharge processes initiated at the measuring electrodes, flow rate can be measured with a high resolution in comparison with that of conventional flowmeters.

BRIEF DESCRIPTION OF THE DRAWINGS

The method of the invention and further advantages will now be explained in greater detail with reference to the accompanying drawings, in which.

DETAILED DESCRIPTION OF EXEMPLARY EMBODIMENTS

Figure 1:
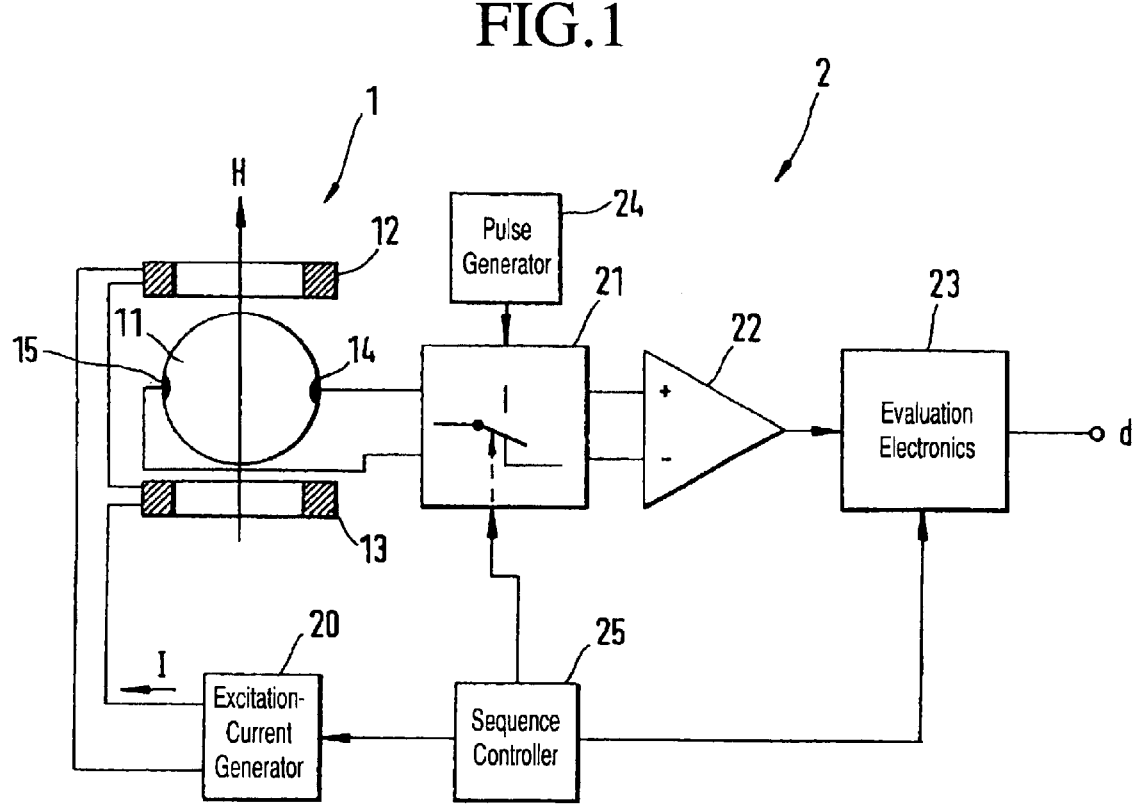
FIG. 1 shows schematically, and partly in block-diagram form, an electromagnetic flowmeter suitable for carrying out the method of the invention.

While the invention is susceptible to various modifications and alternative forms, exemplary embodiments thereof have been shown by way of example in the drawings and will herein be described in detail. It should be understood, however, that there is no intent to limit the invention to the the particular forms diclosed, but on the contrary, the intention is to cover all modifications, equivalents, and alternatives falling within the spirit and scope of the invention as defined by the intended claims.

The flowmeter with which the method of the invention can be carried out comprises a flow sensor 1 and a measuring and control circuit. Flow sensor 1 includes a flow tube 11, which has a tube wall and through which in operation the conductive liquid to be measured flows in the direction of a longitudinal tube axis.

To avoid creating a short circuit for voltages induced in the fluid, an inner portion of flow tube 11, which contacts the liquid, is electrically nonconductive. For this purpose, metal flow tubes are commonly provided with an electrically nonconductive lining, e.g., a lining of hard rubber, polyfluoroethylene, etc, and are generally nonferromagnetic; in the case of flow tubes made completely of plastic or ceramic, particularly of alumina ceramic, the electrically nonconductive lining is not necessary.

A coil assembly of flow sensor 1 has a first field coil 12 and a second field coil 13, which are mounted on flow tube 11. The field coils are located on a first diameter of flow tube 11. In operation, the coil assembly serves to produce a magnetic field H which cuts across the tube wall and the liquid. The magnetic field is set up when an excitation current is caused to flow in field coils 12, 13, which in this embodiment are connected in series. The preferably bipolar excitation current may be, for instance, a square-wave, triangular, or sinusoidal current.

FIG. 1 shows that field coils 12, 13 are so-called air-core coils, i.e., that they are coreless. These coils, as is usual with such coil arrangements, may also be wound on a core which will generally be soft magnetic, and the cores may cooperate with pole pieces; see, for instance, U.S. Pat. No. 5,540,103.

The coil assembly is preferably so designed, and in particular the two field coils 12, 13 are so shaped and dimensioned, that within flow tube 11, the magnetic field H produced with the coil assembly is symmetric, particularly rotationally symmetric, at least with respect to a second diameter which is perpendicular to the first.

As shown in FIG. 1, the excitation current I serving to produce the magnetic field H is generated by a suitable excitation-current generator 20. Preferably, a direct current from a direct-current source, particularly a current regulated at a constant amplitude, is periodically switched in excitation-current generator 20 by means of a polarity reverser and applied to the coil assembly, such that coils 12, 13 are traversed by the current in a first direction during a first phase PH11 and in a direction opposite to the first direction during a succeeding second phase PH12; for the current regulation and polarity reversal, see also U.S. Pat. Nos. 4,410,926 or 6,031,740, for example.

The second phase PH12 is followed by a third phase PH21, during which the excitation current I flows in the first direction again. The third phase is followed by a fourth phase PH22, during which the excitation current I flows in the opposite direction again. This is followed by a corresponding phase PH31 etc. With respect to the reversal of the direction of the excitation current I, pairs of successive phases form respective reversing cycles P1, P2, P3, etc. Essentially in synchronism with the reversal of the excitation current I flowing through the coil assembly, except for any phase shift that may be present, the polarity of the magnetic field H is reversed, see FIG. 2a.

A first electrode 14, positioned on the inside of the wall of flow tube 11, serves to pick off a first potential induced by the magnetic field H. A second electrode 15, also positioned on the inside of the tube wall, serves to pick off a second potential induced by the magnetic field. The measuring electrodes 14, 15 are located on the second diameter of flow tube 11, which is perpendicular to the first diameter and, thus, to the longitudinal tube axis. They may also be located, for example, on a chord of flow tube 11 which is parallel to the second diameter, see also U.S. Pat. No. 5,646,353.

In FIG. 1, the measuring electrodes 14, 15 are galvanic electrodes, i.e., electrodes which contact the liquid. It is also possible to use two capacitive electrodes, i.e., electrodes disposed within the wall of flow tube 11, for example. Each electrode picks off a separate electric potential which in operation is induced in the liquid according to Faraday's law.

The measuring and control electronics 2 comprise a changeover switch which must have one set of changeover contacts for each electrode. Since two measuring electrodes 14, 15 are present in FIG. 2, the associated changeover switch 21 has two sets of changeover contacts, which are not shown separately but are represented by the changeover-switch symbol.

In the position of changeover switch 21 shown in FIG. 1, measuring electrodes 14 and 15 are respectively connected to an inverting input and a noninverting input of a differential amplifier 22. Thus, the difference of the two potentials picked off by measuring electrodes 14, 15 is obtained. From this difference, evaluation electronics 23 compute a measurement signal d proportional to the volumetric flow rate of the liquid in the usual manner, e.g., by periodic sampling and holding; cf., for example, U.S. Pat. Nos. 4,382,387, 4,422, 337, or 4,704,908.

Figure 2A:
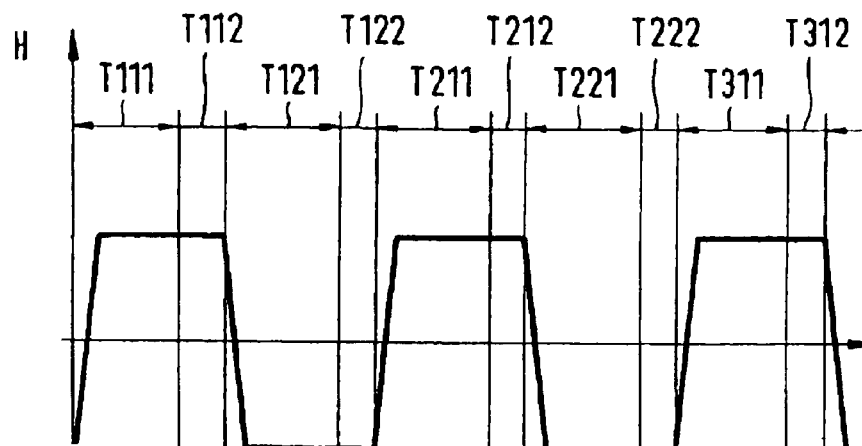
FIG. 2a is a portion of a timing diagram showing the periodically reversed excitation current flowing in the coils during different phases.
Figure 2B:
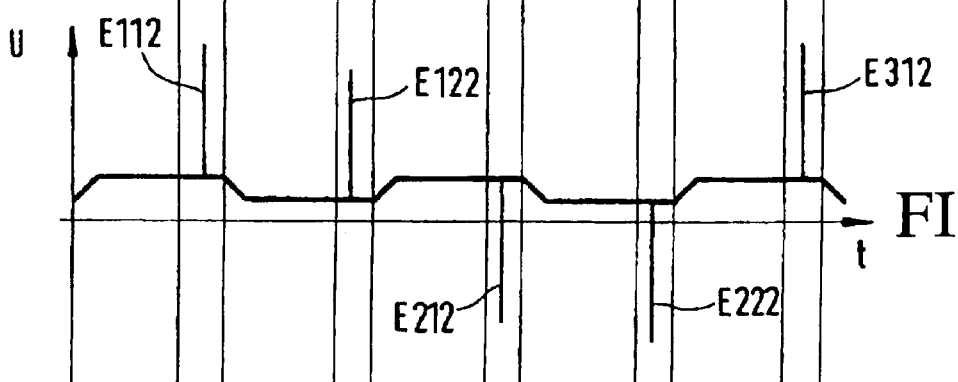
FIG. 2b is a portion of the timing diagram showing the potential induced by the excitation current of FIG. 2 at one of the two measuring electrodes, this electrode being supplied, according to one embodiment of the method of the invention, with several double voltage pulses of one polarity followed by double voltage pulses of the other polarity.
Figure 2C:
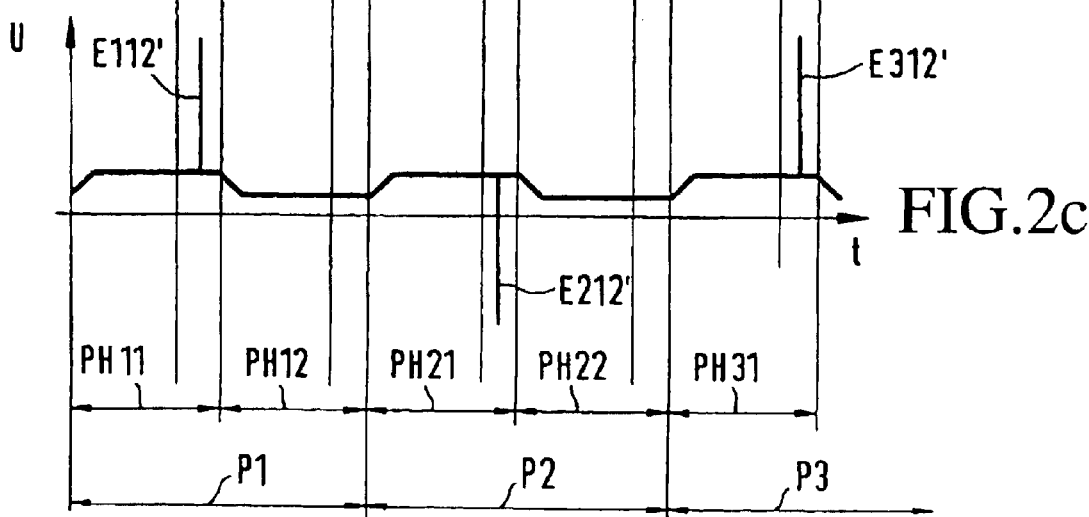
FIG. 2c is a portion of the timing diagram showing the potential induced by the excitation current of FIG. 2 at one of the two measuring electrodes, this electrode being supplied, according to another embodiment of the method of the invention, with several single voltage pulses of one polarity followed by single voltage pulses of the other polarity.

Changeover switch 21 is in the position shown in FIG. 1 during a first subcycle T111 of the first phase PHI 1 of the excitation current I, during a first subcycle T121 of the second phase PH12 of the excitation current I, during a first subcycle T211 of the third phase PH21 of the excitation current I, during a first subcycle T221 of the fourth phase PH22 of the excitation current I, and during a first subcycle T311 of a fifth phase PH31 of the excitation current I, see FIGS. 2a and 2c.

Changeover switch 21 is controlled by a sequence controller 25; one of the outputs of the latter is coupled to the control input of changeover switch 21.

Another output of changeover switch 21 is connected to a control input of excitation-current generator 20, and a further output is connected to evaluation electronics 23. Sequence controller 25 has a clock generator associated with it. In the other position of changeover switch 21, which is not shown in FIG. 1, at least one of the two measuring electrodes 14, 15 is connected to a pulse generator 24. Changeover switch 21 is in this other position during a second subcycle T112, T122, T212, T222, T312 of at least one of the phases PH11, PH12, PH21, PH22, PH31 of the excitation current I, so that a discharge voltage E is applied at least intermittently, particularly periodically, to at least one of the two measuring electrodes 14, 15, with the excitation current I continuing to flow. The charges transferred by means of a discharge voltage E, which preferably consists of a sequence of voltage pulses, serve to charge any interfaces at the measuring electrodes 14, 15 as uniformly as possible and/or to at least partly compensate any interfering potentials existing at the electrode.

According to the invention, the application of the discharge voltage E to the respective electrode 14, 15 includes connecting the respective electrode to a circuit ground of the flowmeter, particularly to a circuit ground of flow sensor 1. In other words, changing a charge on the respective electrode also comprises removing charge from the electrode. A duration for which the discharge voltage is effective, i.e., for which charge is transferred from or to the measuring electrodes in the above sense, may be very short compared to the duration of the second subcycle, as shown; its maximum duration is equal to the duration of the second subcycle.

FIG. 2b shows one of the many possible time sequences of the preferably short-time application of the discharge voltage to one of the measuring electrodes 14, 15. In subcycles T112, T122, T312, respective positive voltage pulses E112, E122, E312 are applied. In subcycles T212, T222, respective negative voltage pulses E212, E222 are applied.

The pair of positive voltage pulses E112, E122 and the pair of negative voltage pulses E212, E222, which are applied during the reversing cycles P1 and P2, respectively, and thus act during the two opposite directions of the excitation current I, represent respective double voltage pulses.

FIG. 2c shows another possible time sequence of the application of the discharge voltage E to at least one of the measuring electrodes 14, 15. During each of subcycles T112, T312, a positive voltage pulse E112', E312' is applied. During subcycle T212, a negative voltage pulse E212' is applied. In FIG. 2c, a positive and a negative voltage pulse are applied alternately during only one direction of the excitation current I.

It is within the scope of the invention to use any combination of sequences of positive and/or negative discharge voltages. For example, if required, fewer voltage pulses than shown in FIGS. 2b and 2c may be applied. "Fewer" means, for example, that a voltage pulse is applied only in every fifth or tenth reversing cycle of the excitation current I.

In FIGS. 2b and 2c, the voltage pulses are shown as needle pulses of very small width as compared to the pulse width of the excitation current I, but their shape may also be square, triangular, trapezoidal, or sinusoidal. Furthermore, the voltage pulses need not be of the same amplitude, as shown, but the amplitude may vary from voltage pulse to voltage pulse. The period of the voltage pulses need not be constant, either, but may vary; it must not exceed the duration of the second subcycle, of course.

The pulse generator 24 is preferably a single-ended DC power source which is briefly connected to the electrode 14 or 15 by means of changeover switch 21. The DC power source preferably has as high an internal resistance as possible.

In FIGS. 2b and 2c it is assumed that the DC power source is a single-ended DC source having as low an internal resistance as possible. In this case, it is possible to use instead of a separate DC source the power source of the measuring and control electronics 2; a separate DC source can thus be dispensed with.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. A method of operating an electromagnetic flowmeter having a flow tube connected into a fluid-conveying line, said method comprising the steps of:

causing the fluid to flow through the flow tube;

causing a, particularly bipolar, excitation current generated by means of a measuring and control circuit of the flowmeter to flow through a coil assembly mounted on the flow tube for producing a magnetic field cutting across the fluid;

inducing a voltage in the moving fluid for changing potentials applied at measuring electrodes positioned at the flow tube;

removing potentials applied to the measuring electrodes for producing a measurement signal derived from the voltage induced in the moving fluid; and applying at least intermittently a discharge voltage generated by a measuring and control circuit to at least one of the measuring electrodes during the flow of the excitation current through the coil assembly.

2. A method as claimed in claim 1 wherein the discharge voltage is an at least intermittently periodic sequence of voltage pulses.

3. A method as claimed in claim 2 wherein two successive voltage pulses are of like polarity.

4. A method as claimed in claim 2 wherein two successive voltage pulses are of different polarity.

5. A method as claimed in claim 2, wherein the voltage pulses have a width substantially smaller than a pulse width of the excitation current.

6. A method as claimed in claim 2, wherein voltage pulses are applied intermittently to both measuring electrodes.

7. A method as claimed in claim 3, wherein the voltage pulses have a width substantially smaller than a pulse width of the excitation current.

8. A method as claimed in claim 3, wherein voltage pulses are applied intermittently to both measuring electrodes.

9. A method as claimed in claim 4, wherein voltage pulses are applied intermittently to both measuring electrodes.

10. A method as claimed in claim 1, wherein voltage pulses are applied intermittently to both measuring electrodes.

11. An electromagnetic flowmeter for a fluid flowing in a line, comprising:

a flow tube connectable into the line for conducting the fluid;

a measuring and control circuit;

means fed by said measuring and control circuit for producing a magnetic field cutting across said flow tube with a coil assembly mounted on said low tube and traversed by an excitation current, said excitation current being clocked periodically;

at least two measuring electrodes for picking off potentials which are induced in the fluid flowing through said flow tube, which fluid is penetrated by the magnetic field;

means connected at least intermittently to said measuring electrodes for generating at least one measurement signal derived from the potentials induced in the fluid; and means controlled by said measuring and control circuit for generating a discharge voltage at the measuring electrodes, said discharge voltage being a periodic sequence of voltage pulses, and said means for generating a discharge voltage in the form of voltage pulses being controlled such that the voltage pulses are applied to said measuring electrodes when the excitation current is different from zero, wherein:

a period of said clocked excitation current is different from a period of said sequence of voltage pulses.

12. The flowmeter as claimed in claim 11, wherein the period of the clocked excitation current is greater than the period of the sequence of voltage pulses.

13. The flowmeter as claimed in claim 11, wherein two successive voltage pulses are of like polarity.

14. The flowmeter as claimed in claim 11, wherein two succesive voltage pulses are of different polarity.

15. The flowmeter as claimed in claim 11, wherein the voltage pulses have a pulse width being substantially smaller than a pulse width of the excitation current.

16. the flowmeter as claimed in claim 11, wherein the voltage oulses are applied intermittently to both measuring electrodes.

17. A method of operating an electromagnetic flowmeter having a flow tube connected into a fluid-conveying line, said method comprising the steps of:

causing the fluid to flow through the flow tube;

causing a, particularly bipolar, excitation current generated by means of a measuring and control circuit of the flowmeter to flow though a coil assembly mounted on the flow tube for producing a magnetic field cutting across the fluid;

inducing a voltage in the moving fluid for changing potentials applied at measuring electrodes positioned at the flow tube;

removing potentials applied to the measuring electrodes for producing a measurement signal derived from the voltage induced in the moving fluid; and applying at least intermittently a discharge voltage generated by a measuring and control circuit to at least one of the measuring electrodes during the flow of the excitation current though the coil assembly, wherein:
the discharge voltage is an at least intermittently periodic sequence of voltage pulses; and
the excitation current is at least intermittently clocked periodically with a predetermined period, with the period of the clocked excitation current being different from a period of the sequence of voltage pulses.

18. A method as claimed in claim 17, wherein the period of the clocked excitation current is greater than the period of the sequence of voltage pulses.

19. A method as claimed in claim 18, wherein the voltage pulses have a width substantially smaller than a pulse width of the excitation current.

20. A method as claimed in claim 18, wherein voltage pulses are applied intermittently to both measuring electrodes.

21. A method as claimed in claim 17, wherein the voltage pulses have a width substantially smaller than a pulse width of the excitation current.

22. A method as claimed in claim 17, wherein voltage pulses are applied intermittently to both measuring electrodes.

23. A method of operating an electromagnetic flowmeter having a flow tube connected into a fluid-conveying line, said method comprising the steps of causing the fluid to flow though the flow tube;

causing a, particularly bipolar, excitation current generated by means of a measuring and control circuit of the flowmeter to flow though a coil assembly mounted on the flow tube for producing a magnetic field cutting across the fluid;

inducing a voltage in the moving fluid for changing potentials applied at measuring electrodes positioned at the flow tube;

removing potentials applied to the measuring electrodes for producing a measurement signal derived from the voltage induced in the moving fluid; and applying at least intermittently a discharge voltage generated by a measuring and control circuit to at least one of the measuring electrodes during the flow of the excitation current through the coil assembly, wherein:
The voltage pulses have a width substantially smaller than a pulse width of the excitation current.

24. A method as claimed in claim 23, wherein voltage pulses are applied intermittently to both measuring electrodes.

25. A method of operating an electromagnetic flowmeter having a flow tube connected into a fluid-conveying line, said method comprising the steps of:

causing the fluid to flow through the flow tube;

causing a, particularly bipolar, excitation current generated by means of a measuring and control circuit of the flowmeter to flow through a coil assembly mounted on the flow tube for producing a magnetic field cutting across the fluid;

inducing a voltage in the moving fluid for changing potentials applied at measuring electrodes positioned at the flow tube;

removing potentials applied to the measuring electrodes for producing a measurement signal derived from the voltage induced in the moving fluid; and applying at least intermittently a discharge voltage generated by a measuring and control circuit to at least one of the measuring electrodes during the flow of the excitation current through the coil assembly, wherein:
the discharge voltage is an at least intermittently periodic sequence of voltage pulses;
two successive voltage pulses are of like polarity; and
The voltage pulses have a width substantially smaller than a pulse width of the excitation current.

26. A method of operating an electromagnetic flowmeter having a flow tube connected into a fluid-conveying line, said method comprising the steps of:

causing the fluid to flow through the flow tube;

causing a, particularly bipolar, excitation current generated by means of a measuring and control circuit of the flowmeter to flow through a coil assembly mounted on the flow tube for producing a magnetic field cutting across the fluid' inducing voltage in the moving fluid for changing potentials applied at measuring electrodes positioned at the flow tube;

removing potentials applied to the measuring electrodes for producing a measurement signal derived from the voltage induced in the moving fluid; and applying at least intermittently a discharge voltage generated by a measuring and control circuit to at least one of the measuring electrodes during the flow of the excitation current through the coil assembly, wherein:

the discharge voltage is an at least intermittently periodic sequence of voltage pulses;
two successive voltage pulses are of different polarity; and voltage pulses are applied intermittently to both measuring electrodes.

* * * * *